(12) United States Patent
Park

(10) Patent No.: US 10,823,025 B2
(45) Date of Patent: Nov. 3, 2020

(54) APPARATUS FOR PURIFYING EXHAUST GAS

(71) Applicants: HYUNDAI MOTOR COMPANY, Seoul (KR); KIA MOTORS CORPORATION, Seoul (KR)

(72) Inventor: Jun Sung Park, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/514,055

(22) Filed: Jul. 17, 2019

(65) Prior Publication Data

US 2020/0149449 A1 May 14, 2020

(30) Foreign Application Priority Data

Nov. 12, 2018 (KR) .................. 10-2018-0138008

(51) Int. Cl.
*F01N 3/08* (2006.01)
*F01N 3/10* (2006.01)
(Continued)

(52) U.S. Cl.
CPC ......... *F01N 3/0814* (2013.01); *B01D 53/945* (2013.01); *B01D 53/9481* (2013.01);
(Continued)

(58) Field of Classification Search
CPC ...... F01N 3/0814; F01N 3/0842; F01N 3/101; F01N 2570/14; F02D 41/0235; B01D 53/945; B01D 53/9481; B01D 2255/1021; B01D 2255/1023; B01D 2255/1025; B01D 2255/1026; B01D 2255/104; B01D 2255/1006; B01D 2255/2065; B01D 2255/20707; B01D 2255/2073; B01D 2255/20738; B01D 2255/20746; B01D 2255/20761; B01D 2255/20776;
(Continued)

(56) References Cited

U.S. PATENT DOCUMENTS 5,448,887 A * 9/1995 Takeshima ......... B01D 53/9481
60/278
6,010,673 A * 1/2000 Kanazawa ........... B01D 53/945
423/213.5
(Continued)

*Primary Examiner* — Thai Ba Trieu
(74) *Attorney, Agent, or Firm* — Brinks Gilson & Lione

(57) ABSTRACT

An apparatus for purifying exhaust gas includes: an engine; an exhaust gas air-fuel ratio adjustor for adjusting an air-fuel ratio of the exhaust gas; a lean $NO_x$ trap (LNT) mounted on the exhaust pipe and generating ammonia or reducing nitrogen oxides or desorbed nitrogen oxides contained in the exhaust gas using a reducing agent including carbon monoxide, hydrocarbon, or hydrogen contained in the exhaust gas; a three way catalyst (TWC) mounted on the exhaust pipe at a rear end of the LNT, and converting noxious gas in the exhaust gas into harmless components through a redox reaction; and a controller controlling the air-fuel ratio of the exhaust gas to a stoichiometric air-fuel ratio when the nitrogen oxide storage or purification performance of the LNT is in the operating period of the engine less than a predetermined level.

15 Claims, 5 Drawing Sheets

(51) Int. Cl.
*B01D 53/94* (2006.01)
*F02D 41/02* (2006.01)

(52) U.S. Cl.
CPC ........... *F01N 3/0842* (2013.01); *F01N 3/101* (2013.01); *F02D 41/0235* (2013.01); *B01D 2255/104* (2013.01); *B01D 2255/106* (2013.01); *B01D 2255/1021* (2013.01); *B01D 2255/1023* (2013.01); *B01D 2255/1025* (2013.01); *B01D 2255/1026* (2013.01); *B01D 2255/2065* (2013.01); *B01D 2255/2073* (2013.01); *B01D 2255/2092* (2013.01); *B01D 2255/20707* (2013.01); *B01D 2255/20715* (2013.01); *B01D 2255/20738* (2013.01); *B01D 2255/20746* (2013.01); *B01D 2255/20761* (2013.01); *B01D 2255/20776* (2013.01); *B01D 2255/20784* (2013.01); *B01D 2255/20792* (2013.01); *B01D 2255/50* (2013.01); *B01D 2255/91* (2013.01); *F01N 2570/14* (2013.01)

(58) Field of Classification Search
CPC ........... B01D 2255/20784; B01D 2255/20792; B01D 2255/2092; B01D 2255/50; B01D 2255/91
USPC .......................................... 60/285, 295, 301
See application file for complete search history.

(56) References Cited

U.S. PATENT DOCUMENTS

| | | | | |
|---|---|---|---|---|
| 6,796,118 B2* | 9/2004 | Kitahara | ............. | F02D 41/0057 60/295 |
| 7,007,462 B2* | 3/2006 | Kitahara | ............... | F02D 41/027 60/299 |
| 7,062,907 B2* | 6/2006 | Kitahara | ............... | F01N 3/0821 60/295 |
| 7,107,760 B2* | 9/2006 | Shirakawa | ............ | F01N 3/0814 60/295 |
| 7,316,108 B2* | 1/2008 | Pott | ......................... | F01N 13/00 60/286 |
| 7,640,730 B2* | 1/2010 | Gandhi | ................. | F01N 3/0814 60/297 |
| 7,818,962 B2* | 10/2010 | Philippe | .................. | F01N 3/206 60/295 |
| 7,963,101 B2 | 6/2011 | Suzuki et al. | | |
| 8,096,111 B2* | 1/2012 | Hoard | .................... | F01N 3/0871 60/295 |
| 8,209,954 B2* | 7/2012 | Yoshida | ............. | B01D 53/9418 60/295 |
| 8,359,837 B2* | 1/2013 | Stroia | ................. | F02D 41/0275 60/295 |
| 8,555,617 B2* | 10/2013 | Mital | ...................... | F01N 3/033 60/295 |
| 8,640,440 B2* | 2/2014 | Klingmann | .......... | B01D 53/944 60/274 |
| 2009/0193796 A1* | 8/2009 | Wei | ....................... | F01N 3/0821 60/297 |
| 2009/0197764 A1* | 8/2009 | Yamato | ................ | B01D 53/945 502/339 |
| 2009/0229260 A1* | 9/2009 | Ogura | ................ | B01D 53/9481 60/299 |
| 2011/0158871 A1* | 6/2011 | Arnold | ................... | F01N 3/2803 423/212 |
| 2012/0042636 A1* | 2/2012 | Asanuma | .............. | F01N 3/0814 60/287 |
| 2013/0243659 A1* | 9/2013 | Sutton | ................ | B01D 53/9418 422/168 |
| 2015/0143799 A1* | 5/2015 | Lee | ..................... | B01D 53/9418 60/295 |
| 2016/0201534 A1* | 7/2016 | Lambert | ............... | F01N 3/0253 60/295 |
| 2017/0014766 A1* | 1/2017 | Schoenhaber | ...... | B01D 53/9477 |
| 2017/0167336 A1* | 6/2017 | Park | ................... | B01D 53/9422 |
| 2017/0191438 A1* | 7/2017 | Hayashita | ................ | F01N 3/101 |
| 2017/0218809 A1* | 8/2017 | Hoyer | ................ | B01D 53/9418 |
| 2018/0010539 A1* | 1/2018 | Inoshita | ................. | F01N 3/2892 |
| 2018/0038302 A1* | 2/2018 | Kanno | ................ | B01D 53/9418 |
| 2018/0171910 A1* | 6/2018 | Tanaka | .................. | F01N 3/0842 |
| 2019/0136730 A1* | 5/2019 | Onozuka | ................ | F01N 3/101 |

* cited by examiner

APPARATUS FOR PURIFYING EXHAUST GAS

CROSS-REFERENCE TO RELATED APPLICATION

This application claims priority to and the benefit of Korean Patent Application No. 10-2018-0138008, filed on Nov. 12, 2018, the entire contents of which are incorporated herein by reference.

FIELD

The present disclosure relates to an apparatus for purifying exhaust gas. More particularly, the present disclosure relates to an apparatus for purifying exhaust gas for maximizing the purification performance of nitrogen oxides contained in the exhaust gas.

BACKGROUND

The statements in this section merely provide background information related to the present disclosure and may not constitute prior art.

Generally, exhaust gas flowing out from an engine through an exhaust manifold is driven into a catalytic converter mounted at an exhaust pipe and is purified therein. After that, the noise of the exhaust gas is decreased while passing through a muffler and then the exhaust gas is emitted into the air through a tail pipe.

The catalytic converter purifies noxious gas components contained in the exhaust gas. In addition, a particulate filter for trapping particulate matter (PM) contained in the exhaust gas is mounted in the exhaust pipe.

A denitrification catalyst ($DeNO_x$ catalyst) is one type of such a catalytic converter and purifies nitrogen oxide ($NO_x$) contained in the exhaust gas. If reducing agents such as urea, ammonia, carbon monoxide, and hydrocarbon (HC) are supplied to the exhaust gas, the $NO_x$ contained in the exhaust gas is reduced in the $DeNO_x$ catalyst through oxidation-reduction reaction with the reducing agents.

Recently, a lean $NO_x$ trap (LNT) catalyst is used as such a $DeNO_x$ catalyst. The LNT catalyst absorbs the $NO_x$ contained in the exhaust gas when air/fuel ratio is lean, and releases the absorbed $NO_x$ and reduces the released nitrogen oxide and the nitrogen oxide contained in the exhaust gas through the reaction with a reducing agent when the air/fuel ratio is rich atmosphere.

Meanwhile, it is desired to develop an exhaust system based on LNT rather than a selective catalytic reduction (SCR) catalyst using urea in order to cope with RDE regulation implemented as EU6c emission gas regulation and to keep cost competitiveness of diesel vehicles.

The LNT shows a high nitrogen oxide purification performance at a temperature of less than 400° C. and a flow rate of less than 150 kg/h, while a nitrogen oxide purification performance is drastically deteriorated at a high temperature or a high flow rate condition: 400° C. or more, or 150 kg/h or higher. In the existing technology, a three way catalyst is added to the front of the LNT as a solution of the limitation of the LNT. When the LNT does not reach the activation temperature, the nitrogen oxide is purified using the three way catalyst through the rich operation, and the nitrogen oxide is purified through the stoichiometric operation under the high load operation condition.

However, we have discovered that when the conventional three way catalyst and LNT layout (LNT is located downstream of TWC) are applied in a low temperature condition of an internal combustion engine that generates explosion by injecting fuel into high temperature and high pressure air, the nitrogen oxide storage performance is deteriorated in a low temperature condition, and performance degradation can occur. This is because the three way catalyst is very disadvantageous for adsorbing nitrogen oxides in terms of chemical composition. Further, when the rich operation is performed under the above conditions, the nitrogen oxide purification performance deteriorates more than when the LNT alone is applied. In addition, it is inappropriate to limit the stoichiometric air-fuel ratio operation only by the criterion according to whether or not the engine is operated under a high load condition. This is because the LNT can be exposed at the active temperature range in the transient condition even in the high load operation condition, and the temperature and flow conditions that can secure the performance of the LNT are exhibited even in the low speed low load condition.

The above information disclosed in this Background section is only for enhancement of understanding of the background of the present disclosure and therefore it may contain information that does not form the prior art that is already known to a person of ordinary skill in the art.

SUMMARY

The present disclosure provides a method for purifying nitrogen oxides in an internal combustion engine that produces explosive power by injecting fuel into high temperature and high pressure air by performing the air-fuel ratio control based on the operation characteristics of the engine and the LNT characteristic based on post treatment system consisting of LNT and three way catalyst, therefore to provide an exhaust gas purification system that can reduce fuel consumption as well as reduce costs in addition to RDE regulatory response.

An apparatus for purifying exhaust gas according to an exemplary form of the present disclosure includes: an engine that generates power by burning a mixture of air and fuel and discharges the exhaust gas generated in the combustion process of the engine to the outside of the engine through an exhaust pipe; an exhaust gas air-fuel ratio adjustor provided in the engine and adjusting an air-fuel ratio of the exhaust gas discharged from the engine; a lean $NO_x$ trap (LNT) mounted on the exhaust pipe at a rear end of the engine, and generating ammonia or reducing nitrogen oxides or desorbed nitrogen oxides contained in the exhaust gas using a reducing agent including carbon monoxide, hydrocarbon, or hydrogen contained in the exhaust gas; a three way catalyst (TWC) mounted on the exhaust pipe at a rear end of the LNT, and converting noxious gas containing carbon monoxide, hydrocarbon, and nitrogen oxide contained in the exhaust gas into harmless components through a redox reaction; and a controller controlling the air-fuel ratio of the exhaust gas to a stoichiometric air-fuel ratio when a nitrogen oxide storage or purification performance of the LNT is in the operating period of the engine less than a predetermined level.

The exhaust gas air-fuel ratio adjustor may include at least one of an air amount adjusting device for adjusting the amount of air supplied to the engine, and a fuel amount adjusting device for adjusting the amount of fuel supplied to the engine.

The LNT may store nitrogen oxides contained in the exhaust gas in an atmosphere where the air-fuel ratio of the exhaust gas is lean, and desorb and purifies the nitrogen oxide occluded in an atmosphere rich in the air-fuel ratio of the exhaust.

The LNT may be made of one selected from the group consisting of alkali metals including potassium (K), sodium (Na), lithium (Li), and cesium (Cs), alkaline earth metals including barium (Ba), calcium (Ca), rare earth metals including iridium (Ir) and lanthanum (La), noble metals including platinum (Pt), palladium (Pd), and rhodium (Rh), or a combination thereof.

The three way catalyst may be made of one selected from the group consisting of ceria ($CeO_2$), zirconia ($ZrO_2$), platinum (Pt), palladium (Pd), rhodium (Rh), zeolite, alumina ($Al_2O_3$), gold (Au), titania and manganese (Mn), or a combination of thereof.

The content of the noble metal including platinum (Pt), palladium (Pd) and rhodium (Rh) in the three way catalyst may be 3 g/l or less.

The three way catalyst may have an improved purification performance of carbon monoxide and hydrocarbon as the atmosphere is lean, and have an improved purification performance of nitrogen oxide as the atmosphere is rich.

The three way catalyst may have a drastically changing purification performance of carbon monoxide, hydrocarbons and nitrogen oxides in the vicinity of the stoichiometric ratio where the lean atmosphere and the rich atmosphere cross each other.

The three way catalyst may include a nitrogen oxide storage material.

The predetermined level may be set to be a level that the nitrogen oxide storage capability of the LNT is lower than a first set level with respect to the maximum nitrogen oxide storage performance or the nitrogen oxide desorption and purification performance of the LNT is lower than the second set level.

The predetermined level may be set differently according to an operating condition of the engine.

The first set level may be a value that is equal to or greater than 25%.

The second set level may be a value that is equal to or greater than 50% and equal to or less than 90%.

The stoichiometric air-fuel ratio may be a value that is equal to or greater than 0.95 and equal to or less than 1.05.

An apparatus for purifying exhaust gas according to another exemplary form of the present disclosure includes: an engine that generates power by burning a mixture of air and fuel and discharges the exhaust gas generated in the combustion process of the engine to the outside of the engine through an exhaust pipe; an exhaust gas air-fuel ratio adjustor provided in the engine and adjusting an air-fuel ratio of the exhaust gas discharged from the engine; a lean $NO_x$ trap (LNT) mounted on the exhaust pipe at a rear end of the engine, and generating ammonia or reducing nitrogen oxides or desorbed nitrogen oxides contained in the exhaust gas using a reducing agent including carbon monoxide, hydrocarbon, or hydrogen contained in the exhaust gas; a diesel particulate matter filter (DPF) mounted on the exhaust pipe at a rear end of the LNT and coated with a three way catalyst converting noxious gas containing carbon monoxide, hydrocarbon, and nitrogen oxide contained in the exhaust gas into harmless components through a redox reaction; and a controller controlling the air-fuel ratio of the exhaust gas to a stoichiometric air-fuel ratio when the nitrogen oxide storage or purification performance of the LNT is in the operating period of the engine less than the predetermined level.

In other form of the present disclosure, an apparatus for purifying exhaust gas includes: an engine that generates power by burning a mixture of air and fuel and discharges the exhaust gas generated in the combustion process of the engine to the outside of the engine through an exhaust pipe; an exhaust gas air-fuel ratio adjustor provided in the engine and adjusting an air-fuel ratio of the exhaust gas discharged from the engine; a lean $NO_x$ trap (LNT) mounted on the exhaust pipe at a rear end of the engine, and generating ammonia or reducing nitrogen oxides or desorbed nitrogen oxides contained in the exhaust gas using a reducing agent including carbon monoxide, hydrocarbon, or hydrogen contained in the exhaust gas; a three way catalyst (TWC) mounted on the exhaust pipe at a rear end of the LNT, and converting noxious gas containing carbon monoxide, hydrocarbon, and nitrogen oxide contained in the exhaust gas into harmless components through a redox reaction; a diesel particulate matter (SDPF) mounted on the exhaust pipe at a rear end of the TWC and coated with a selective catalytic reduction (SCR) temporarily storing ammonia generated in the LNT and reacting the stored ammonia with nitrogen oxides contained in the exhaust gas to purify nitrogen oxides contained in the exhaust gas; and a controller controlling the air-fuel ratio of the exhaust gas to a stoichiometric air-fuel ratio when the nitrogen oxide storage or purification performance of the LNT is in the operating period of the engine less than the predetermined level.

The SCR may be made of one selected from one of a zeolite catalyst and a metal catalyst supported on porous alumina, or a combination thereof.

The zeolite catalyst may be made such that at least one element of copper (Cu), platinum (Pt), manganese (Mn), iron (Fe), cobalt (Co), nickel (Ni), zinc (Zn), cesium (Cs) exchange ions one another.

The metal catalyst supported on porous alumina may be made such that at least one metal of platinum (Pt), palladium (Pd), rhodium (Rh), iridium (Ir), ruthenium (Ru), tungsten (W), chrome (Cr), manganese (Mn), iron (Fe), cobalt (Co), copper (Cu), zinc (Zn), silver (Ag) are supported on the porous alumina.

According to an exemplary form of the present disclosure, by performing the air-fuel ratio control based on the operation characteristics of the engine and the LNT characteristic, real driving emission harmful gas exhaust amount may be reduced or minimized, and the improved diesel engine harmful gas purification performance under all operating conditions can meet EU6c and higher exhaust emission regulations such as RDE.

Further, fuel efficiency can be improved by improving exhaust gas purification performance.

Further, it is possible to apply exhaust gas post treatment system that does not use urea, thereby reducing the manufacturing cost of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
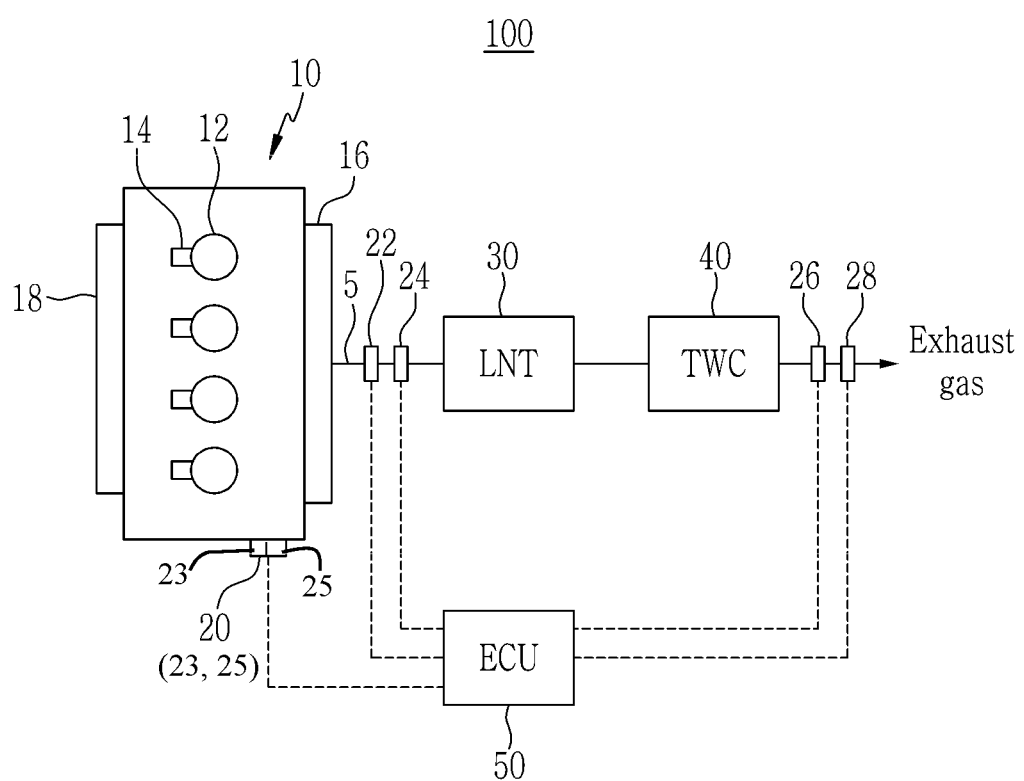
FIG. 1 is a schematic view showing an exhaust gas purifying apparatus according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The sizes and thicknesses of the configurations shown in the drawings are provided selectively for the convenience of description, such that the present disclosure is not limited to those shown in the drawings and the thicknesses are exaggerated to make some parts and regions clear.

The parts unrelated to the description are not described in order to clearly describe the present disclosure and like reference numerals designate like elements throughout the specification.

In the detailed description, ordinal numbers are used for distinguishing constituent elements having the same terms, and have no specific meanings.

FIG. 1 is a schematic view showing an exhaust gas purifying apparatus according to an exemplary form of the present disclosure.

As shown in FIG. 1, an apparatus (100) for purifying exhaust gas includes an engine 10, an exhaust gas air-fuel ratio adjustor 20, a lean NOx trap (LNT) 30, a three way catalyst (TWC) 40, and a controller 50.

The engine 10 burns air-fuel mixture in which fuel and air are mixed so as to convert chemical energy into mechanical energy. The engine 10 is connected to an intake manifold 18 so as to receive the air into a combustion chamber 12, and is connected to an exhaust manifold 16 so as to discharge the exhaust gas generated at combustion process and gathered in the exhaust manifold 16 to the exterior of the engine 10. An injector 14 is mounted in the combustion chamber 12 so as to inject the fuel into the combustion chamber 12.

A diesel engine is exemplified herein, but a lean-burn gasoline engine may be used. In a case that the gasoline engine is used, the air/fuel mixture flows into the combustion chamber 12 through the intake manifold 18, and a spark plug (not shown) is mounted at an upper portion of the combustion chamber 12. In addition, if a gasoline direct injection (GDI) engine is used, the injector 14 is mounted at the upper portion of the combustion chamber 12.

The exhaust gas air-fuel ratio adjustor 20 is provided in the engine 10 for adjusting an air-fuel ratio of the exhaust gas discharged from the engine 10. The exhaust gas air-fuel ratio adjustor 20 may be configured as an air amount adjusting device (23) for adjusting air amount supplied to the engine 10 or as a fuel amount adjusting device (25) for adjusting fuel amount supplied to the engine 10. Further, the exhaust gas air-fuel ratio adjustor 20 may be configured to include the air amount adjusting device (23) and the fuel amount adjusting device (25), or configured as one device for adjusting air and fuel amount.

The exhaust pipe 5 is connected with the exhaust manifold 16 to exhaust the exhaust gas to outside of the vehicle. The LNT 30 and the TWC 40 are mounted on the exhaust pipe 5 to eliminate particulate matters and nitrogen oxides contained in the exhaust gas.

The LNT 30 is mounted on the exhaust pipe 5 at a rear end of the engine 10. The LNT 30 absorbs nitrogen oxides ($NO_x$) contained in the exhaust gas in a lean atmosphere, desorbs nitrogen oxides absorbed in a rich atmosphere, and reduces nitrogen oxides or desorbed nitrogen oxides contained in the exhaust gas or generates ammonia. Further, the LNT 30 oxidizes carbon monoxide (CO) and hydrocarbons (HC) contained in the exhaust gas.

Here, it should be understood that hydrocarbons (HC) refer to both exhaust gas and compounds composed of carbon and hydrogen contained in the fuel.

The LNT 30 may be made of one selected from the group consisting of alkali metals including potassium (K), sodium (Na), lithium (Li), and cesium (Cs), alkaline earth metals including barium (Ba), calcium (Ca), rare earth metals including iridium (Ir) and lanthanum (La), noble metals including platinum (Pt), palladium (Pd), and rhodium (Rh), or a combination thereof.

The TWC 40 is mounted on the exhaust pipe 5 at a rear end of the LNT, and may convert noxious gas containing carbon monoxide, hydrocarbon, and nitrogen oxide contained in the exhaust gas into harmless components through a redox reaction. For example, the TWC 40 may convert hydrocarbons (HC) in the exhaust gas into H2O and CO2 as oxidation reactions, CO2 as CO2, and NO as N2 and NO2.

The TWC 40 according to an exemplary form of the present disclosure may be made of one selected from the group consisting of ceria ($CeO_2$), zirconia ($ZrO_2$), platinum (Pt), palladium (Pd), rhodium (Rh), zeolite, alumina ($Al_2O_3$), gold (Au), titania and manganese (Mn), or a combination of thereof. At this time, the content of the noble metal including platinum (Pt), palladium (Pd) and rhodium (Rh) in the TWC 40 may be 3 g/l or less. Further, the TWC 40 may include nitrogen oxide storage material.

Meanwhile, a first oxygen sensor 22 is mounted on the exhaust pipe 5 in front of the LNT 30 to detect the amount of oxygen in the exhaust gas that has passed through the engine 10 and transmit the detected amount of oxygen to the controller 50, thereby the controller 50 can perform the lean/rich control operation.

Further, a temperature sensor 24 is mounted on the front exhaust pipe 5 of the LNT 30 to detect the temperature of the exhaust gas that has passed through the engine 10.

A second oxygen sensor 26 or a nitrogen oxide sensor 28 may be mounted on the exhaust pipe 5 at the rear end of the TWC 40. The second oxygen sensor 26 measures the amount of oxygen contained in the exhaust gas at the rear end of the TWC 40 and transmits the detected signal to the controller 50. Based on the detected values of the first oxygen sensor 22 and the second oxygen sensor 26, the controller 50 can perform the lean/rich control of the exhaust gas.

The nitrogen oxide sensor 28 measures the amount of nitrogen oxide contained in the exhaust gas at the rear end of the TWC 40 and transmits the detected signal to the controller 50. The amount of nitrogen oxide measured at the nitrogen oxide sensor 28 may be used to determine the amount of reducing agent to be injected in the injection module (not shown).

The controller 50 may control the air-fuel ratio of the exhaust gas to a stoichiometric air-fuel ratio when the nitrogen oxide storage or purification performance of the LNT 30 is less than a predetermined level.

At this time, the predetermined level may be set to be a level that the nitrogen oxide storage capability of the LNT 30 is lower than a first set level with respect to the maximum nitrogen oxide storage performance or the nitrogen oxide desorption and purification performance of the LNT 30 is lower than a second set level. The predetermined level may be set differently according to an operating condition of the engine 10.

Further, the first set level may be a value that is equal to or greater than 25%, and the second set level may be a value that is equal to or greater than 50% and equal to or less than 90%. When the nitrogen oxide storage level is above the first set level, the nitrogen oxide slip amount gradually increases, and the amount of nitrogen oxide discharged into the atmosphere is rapidly increased. Therefore, it is desired to set the setting level to a lower level in order to cope with a stronger emission control regulation. Even when the nitrogen oxide desorption/purification performance becomes lower than the second set level, it becomes difficult to cope with the exhaust gas regulation. Even when the Urea-SCR system is used together, when the nitrogen oxide purification performance is lowered to 50% or less, the nitrogen oxide purification operation is accompanied by a considerable amount of nitrogen oxide slip. Accordingly, it is desired to maintain the nitrogen oxide purification performance of 50-60% or more. And, as with the first setting level, nitrogen oxides desorption/purification performance of 70-90% or more is desired for a stronger emission regulation response. Further, the stoichiometric air-fuel ratio may be a value that is equal to or greater than 0.95 and equal to or less than 1.05.

Figure 2:
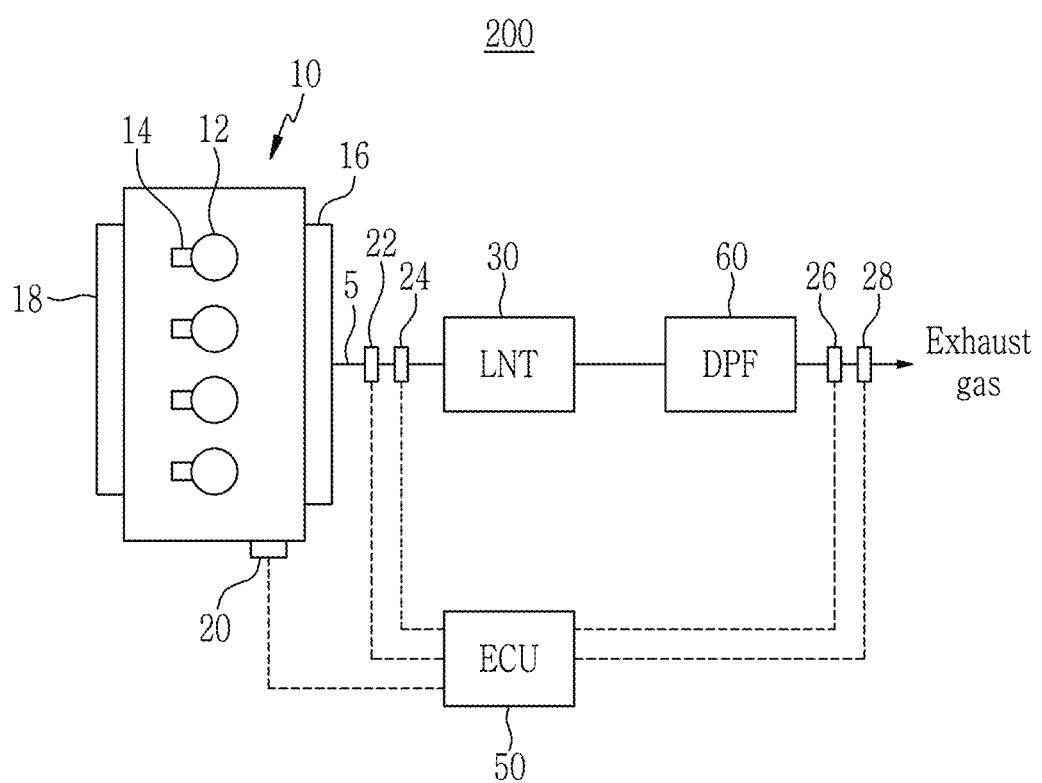
FIG. 2 is a schematic view showing an exhaust gas purifying apparatus according to another exemplary form of the present disclosure.

FIG. 2 is a schematic view showing an exhaust gas purifying apparatus according to another exemplary form of the present disclosure.

Referring to FIG. 2, an apparatus 200 for purifying exhaust gas includes an engine 10, an exhaust gas air-fuel ratio adjustor 20, a lean $NO_x$ trap (LNT) 30, a diesel particulate matter filter (DPF) 60, and a controller 50.

The apparatus for purifying exhaust gas 200 shown in FIG. 2 is the same as the form shown in FIG. 1 except that the diesel particulate matter filter (DPF) 60 is provided instead of the TWC 40, therefore only the DPF 60 will be described.

The DPF 60 is mounted on the exhaust pipe at a rear end of the LNT 30, and traps particulate matter contained in the exhaust gas. The DPF 60 may be coated with a three way catalyst converting noxious gas containing carbon monoxide, hydrocarbon, and nitrogen oxide contained in the exhaust gas into harmless components through a redox reaction.

The three way catalyst may be made of one selected from the group consisting of ceria ($CeO_2$), zirconia ($ZrO_2$), platinum (Pt), palladium (Pd), rhodium (Rh), zeolite, alumina ($Al_2O_3$), gold (Au), titania and manganese (Mn), or a combination of thereof, and the content of the noble metal including platinum (Pt), palladium (Pd) and rhodium (Rh) in the three way catalyst may be 3 g/l or less. Further, the three way catalyst may include a nitrogen oxide storage material.

Conventionally, the DPF 60 includes a plurality of inlet channels and outlet channels. The inlet channel is open at its one end and closed at its other end. The outlet channel is closed at its one end and closed at its other end to exhaust the exhaust gas inside the DPF 60. The exhaust gas flowing into the DPF 60 through the inlet channel enters the outlet channel through a porous partition wall that divides the inlet channel and the outlet channel, and then is discharged from the DPF 60 through the outlet channel. Particulate matter contained in the exhaust gas is collected during the passage of the exhaust gas through the porous partition wall.

Figure 3:
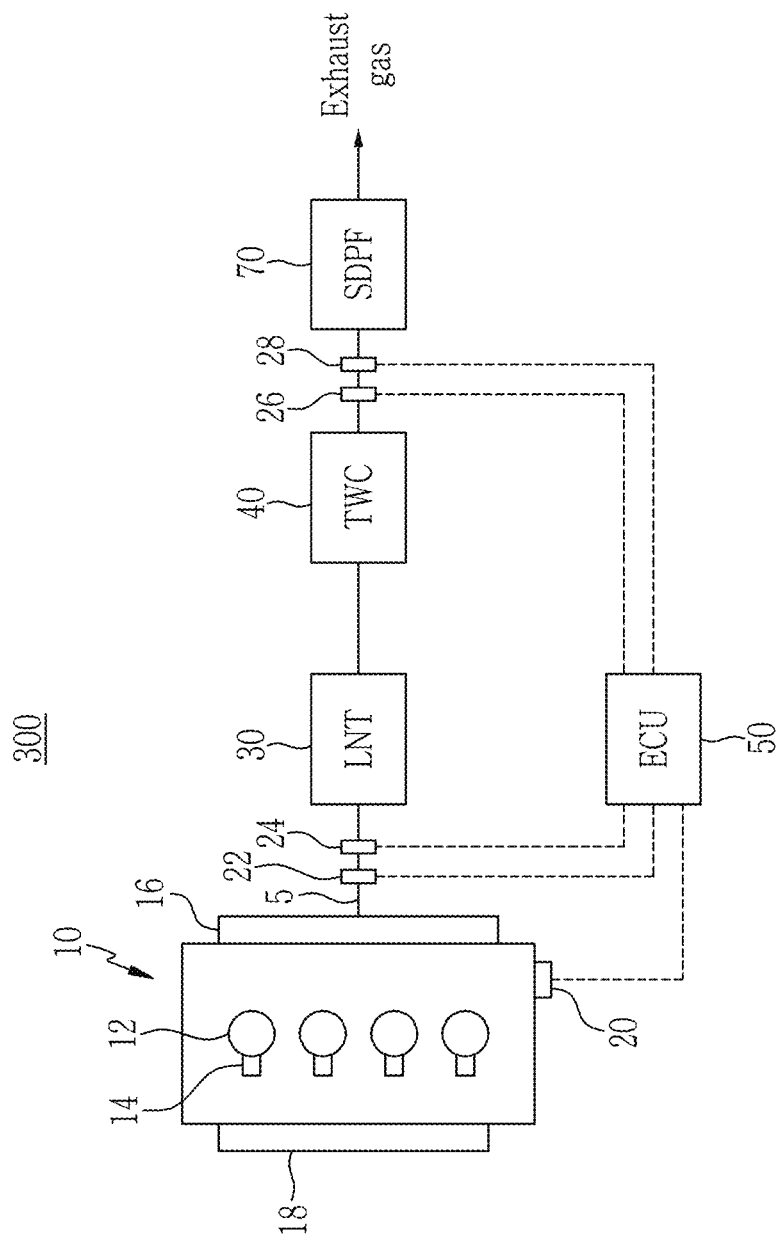
FIG. 3 is a schematic view showing an exhaust gas purifying apparatus according to another exemplary form of the present disclosure.

FIG. 3 is a schematic view showing an exhaust gas purifying apparatus according to another exemplary form of the present disclosure.

Referring to FIG. 3, an apparatus 300 for purifying exhaust gas includes an engine 10, an exhaust gas air-fuel ratio adjustor 20, an LNT 30, a TWC 40, a diesel particulate matter (SDPF) 70 coated with a selective catalytic reduction (SCR), and a controller 50.

The apparatus for purifying exhaust gas 300 shown in FIG. 3 is the same as the form shown in FIG. 1 except that the SDPF 70 is additionally provided, and therefore, the SDPF 70 will be described here.

The SDPF 70 is mounted on the exhaust pipe at a rear end of the TWC 40, and temporarily stores ammonia generated in the LNT 30 and reacts the stored ammonia with nitrogen oxides contained in the exhaust gas to purify nitrogen oxides contained in the exhaust gas.

The SDPF 70 is coated with an SCR catalyst on the partition walls constituting the channels of the DPF.

The SCR may be made of one selected from one of a zeolite catalyst and a metal catalyst supported on porous alumina, or a combination thereof. The zeolite catalyst may be made such that at least one element of copper (Cu), platinum (Pt), manganese (Mn), iron (Fe), cobalt (Co), nickel (Ni), zinc (Zn), cesium (Cs) exchange ions one another. Further, the metal catalyst supported on porous alumina may be made such that at least one metal of platinum (Pt), palladium (Pd), rhodium (Rh), iridium (Ir), ruthenium (Ru), tungsten (W), chrome (Cr), manganese (Mn), iron (Fe), cobalt (Co), copper (Cu), zinc (Zn), silver (Ag) are supported on the porous alumina.

Figure 4:
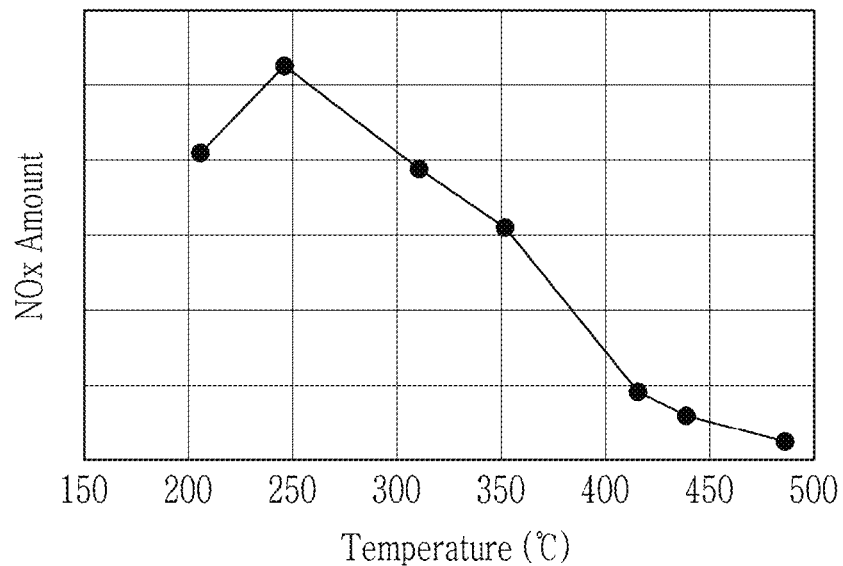
FIG. 4 is a graph showing the amount of nitrogen oxides stored in the LNT depending on the temperature.

FIG. 4 is a graph showing the amount of nitrogen oxides stored in the LNT depending on the temperature. In addition, FIG. 5 is a graph showing the harmful gas purification efficiency of the three-way catalyst according to the air-fuel ratio.

As shown in FIG. 4, the LNT 30 stores the largest amount of nitrogen oxides at about 250° C., and when the temperature rises above 250° C., the nitrogen oxide storage ability becomes poor, and when the temperature rises above about 400° C., the nitrogen oxide is hardly occluded.

Figure 5:
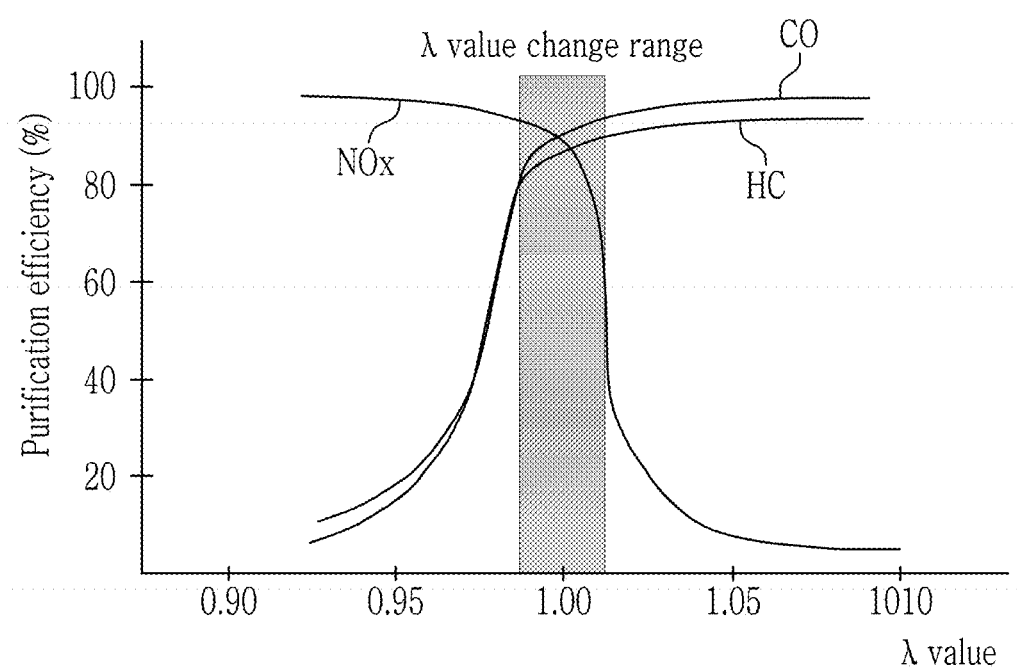
FIG. 5 is a graph showing the harmful gas purification efficiency of the three-way catalyst according to the air-fuel ratio.

Further, as shown in FIG. 5, the TWC 40 improves the carbon monoxide and hydrocarbon purification performance in a lean atmosphere, and the richer the atmosphere, the more the nitrogen oxide purification performance improves. Further, the purification performance of the TWC 40 for carbon monoxide, hydrocarbon, and nitrogen oxide is drastically changed in the vicinity of the theoretical air-fuel ratio in which the lean atmosphere and the rich atmosphere cross.

If the temperature of the exhaust gas becomes about 400° C. or higher and the nitrogen oxide purification performance of the LNT 30 cannot be maintained high, the controller 50 controls the air-fuel ratio to the stoichiometric air-fuel ratio. The controller 50 may adjust the amount of air or adjust the amount of fuel through the exhaust gas air-fuel ratio adjustor 20. Alternatively, both the air amount and the fuel amount can be adjusted to the stoichiometric air-fuel ratio. At this time, the stoichiometric air-fuel ratio may be a value that is equal to or greater than 0.95 and equal to or less than 1.05 ($\lambda$ value change range).

The predetermined level, which is a reference at which the nitrogen oxide purification performance of the LNT 30 cannot be maintained high, can be set differently according to the operating condition of the engine 10. The controller 50 adjusts the air-fuel ratio to the stoichiometric air-fuel ratio when it is below the predetermined level. For this purpose, the controller 50 may be implemented with one or more processors operating by a set program.

At this time, the predetermined level may be set to be a level that the nitrogen oxide storage capability of the LNT 30 is lower than a first set level with respect to the maximum nitrogen oxide storage performance or the nitrogen oxide desorption and purification performance of the LNT 30 is lower than a second set level, and the first set level may be a value that is equal to or greater than 25%, and the second set level may be a value that is equal to or greater than 50% and equal to or less than 90%.

Like this, according to an exemplary form of the present disclosure, by performing the air-fuel ratio control based on the operation characteristics of the engine and the LNT characteristic, real driving emission harmful gas exhaust amount may be reduced or minimized, and improvement of diesel engine harmful gas purification performance under all operating conditions can meet EU6c and higher exhaust emission regulations including RDE.

Further, fuel efficiency can be improved by improving exhaust gas purification performance.

Further, it is possible to apply exhaust gas post treatment system that does not use urea, thereby reducing the manufacturing cost of the vehicle.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

| | |
|---|---|
| 100, 200, 300: apparatus for purifying exhaust gas | |
| 10: engine | 12: combustion chamber |
| 14: injector | 16: exhaust manifold |
| 18: intake manifold | 20: exhaust gas air-fuel ratio adjustor |
| 22: first oxygen sensor | 24: temperature sensor |
| 26: second oxygen sensor | 28: nitrogen oxide sensor |
| 30: lean $NO_x$ trap (LNT) | 40: three way catalyst (TWC) |
| 50: controller(ECU) | 60: diesel particulate matter filter (DPF) |
| 70: diesel particulate matter filter coated with selective catalytic reduction (SDPF) | |

What is claimed is:

1. An apparatus for purifying exhaust gas, comprising:
   an engine configured to generate power by burning a mixture of air and fuel and to discharge exhaust gas generated in a combustion process of the engine to outside of the engine through an exhaust pipe;
   an exhaust gas air-fuel ratio adjustor provided in the engine and configured to adjust an air-fuel ratio of the exhaust gas discharged from the engine;
   a lean $NO_x$ trap (LNT) mounted on the exhaust pipe at a rear end of the engine, and configured to generate ammonia or configured to reduce nitrogen oxides or desorbed nitrogen oxides contained in the exhaust gas using a reducing agent including carbon monoxide, hydrocarbon, or hydrogen contained in the exhaust gas;
   a three way catalyst mounted on the exhaust pipe at a rear end of the LNT, and configured to convert noxious gas containing carbon monoxide, hydrocarbon, and nitrogen oxide contained in the exhaust gas into harmless components through a redox reaction; and
   a controller configured to control the air-fuel ratio of the exhaust gas to a stoichiometric air-fuel ratio when a nitrogen oxide storage or purification performance of the LNT is in an operating period of the engine less than a predetermined level,
   wherein:
   the predetermined level is set differently based on an operating condition of the engine,
   the predetermined level is set to be a level that a nitrogen oxide storage capability of the LNT is lower than a first set level with respect to a maximum nitrogen oxide storage performance or nitrogen oxide desorption and purification performance of the LNT is lower than a second set level,
   the first set level is a value that is equal to or greater than 25%, and
   the second set level is a value that is equal to or greater than 50% and equal to or less than 90%.

2. The apparatus for purifying exhaust gas of claim 1, wherein:
   the exhaust gas air-fuel ratio adjustor includes at least one of an air amount adjusting device configured to adjust an amount of air supplied to the engine, and a fuel amount adjusting device configured to adjust an amount of fuel supplied to the engine.

3. The apparatus for purifying exhaust gas of claim 1, wherein:
   the LNT stores nitrogen oxides contained in the exhaust gas in an atmosphere where the air-fuel ratio of the exhaust gas is lean, and desorbs and purifies the nitrogen oxide occluded in an atmosphere rich in the air-fuel ratio of the exhaust.

4. The apparatus for purifying exhaust gas of claim 1, wherein:
   the LNT is made of one selected from the group consisting of alkali metals including potassium (K), sodium (Na), lithium (Li), and cesium (Cs), alkaline earth metals including barium (Ba), calcium (Ca), rare earth metals including iridium (Ir) and lanthanum (La), noble metals including platinum (Pt), palladium (Pd), and rhodium (Rh), or a combination thereof.

5. The apparatus for purifying exhaust gas of claim 1, wherein:
   the three way catalyst is made of one selected from the group consisting of ceria ($CeO_2$), zirconia ($ZrO_2$), platinum (Pt), palladium (Pd), rhodium (Rh), zeolite, alumina ($Al_2O_3$), gold (Au), titania and manganese (Mn), or a combination of thereof.

6. The apparatus for purifying exhaust gas of claim 5, wherein:
   a noble metal including platinum (Pt), palladium (Pd) and rhodium (Rh) in the three way catalyst is 3 g/l or less.

7. The apparatus for purifying exhaust gas of claim 1, wherein:
   the three way catalyst has an improved purification performance of carbon monoxide and hydrocarbon as an atmosphere is lean, and has an improved purification performance of nitrogen oxide as the atmosphere is rich.

8. The apparatus for purifying exhaust gas of claim 7, wherein:
   the three way catalyst has a drastically changing purification performance of carbon monoxide, hydrocarbons and nitrogen oxides in a vicinity of the stoichiometric ratio where the lean atmosphere and the rich atmosphere cross each other.

9. The apparatus for purifying exhaust gas of claim 1, wherein:
the three way catalyst includes a nitrogen oxide storage material.

10. The apparatus for purifying exhaust gas of claim 1, wherein:
the stoichiometric air-fuel ratio is a value that is equal to or greater than 0.95 and equal to or less than 1.05.

11. An apparatus for purifying exhaust gas, comprising:
an engine configured to generate power by burning a mixture of air and fuel and to discharge exhaust gas generated in a combustion process of the engine to outside of the engine through an exhaust pipe;
an exhaust gas air-fuel ratio adjustor provided in the engine and configured to adjust an air-fuel ratio of the exhaust gas discharged from the engine;
a lean NOx trap (LNT) mounted on the exhaust pipe at a rear end of the engine, and configured to generate ammonia or configured to reduce nitrogen oxides or desorbed nitrogen oxides contained in the exhaust gas using a reducing agent including carbon monoxide, hydrocarbon, or hydrogen contained in the exhaust gas; and
a diesel particulate matter filter (DPF) mounted on the exhaust pipe at a rear end of the LNT and coated with a three way catalyst, and configured to convert noxious gas containing carbon monoxide, hydrocarbon, and nitrogen oxide contained in the exhaust gas into harmless components through a redox reaction; and
a controller configured to control the air-fuel ratio of the exhaust gas to a stoichiometric air-fuel ratio when a nitrogen oxide storage or purification performance of the LNT is in an operating period of the engine less than a predetermined level,
wherein;
the predetermined level is set differently based on an operating condition of the engine,
the predetermined level is set to be a level that a nitrogen oxide storage capability of the LNT is lower than a first set level with respect to a maximum nitrogen oxide storage performance or nitrogen oxide desorption and purification performance of the LNT is lower than a second set level,
the first set level is a value that is equal to or greater than 25%, and
the second set level is a value that is equal to or greater than 50% and equal to or less than 90%.

12. An apparatus for purifying exhaust gas, comprising:
an engine configured to generate power by burning a mixture of air and fuel and to discharge exhaust gas generated in a combustion process of the engine to outside of the engine through an exhaust pipe;
an exhaust gas air-fuel ratio adjustor provided in the engine and configured to adjust an air-fuel ratio of the exhaust gas discharged from the engine;
a lean NOx trap (LNT) mounted on the exhaust pipe at a rear end of the engine, and configured to generate ammonia or to reduce nitrogen oxides or desorbed nitrogen oxides contained in the exhaust gas using a reducing agent including carbon monoxide, hydrocarbon, or hydrogen contained in the exhaust gas;
a three way catalyst mounted on the exhaust pipe at a rear end of the LNT, and configured to convert noxious gas containing carbon monoxide, hydrocarbon, and nitrogen oxide contained in the exhaust gas into harmless components through a redox reaction;
a diesel particulate matter (SDPF) mounted on the exhaust pipe at a rear end of the TWC and coated with a selective catalytic reduction (SCR) configured to temporarily store ammonia generated in the LNT and to react the stored ammonia with nitrogen oxides contained in the exhaust gas to purify nitrogen oxides contained in the exhaust gas; an
a controller configured to control the air-fuel ratio of the exhaust gas to a stoichiometric air-fuel ratio when a nitrogen oxide storage or purification performance of the LNT is in an operating period of the engine less than a predetermined level,
wherein:
the predetermined level is set differently based on an operating condition of the engine,
the predetermined level is set to be a level that a nitrogen oxide storage capability of the LNT is lower than a first set level with respect to a maximum nitrogen oxide storage performance or nitrogen oxide desorption and purification performance of the LNT is lower than a second set level,
the first set level is a value that is equal to or greater than 25%, and
the second set level is a value that is equal to or greater than 50% and equal to or less than 90%.

13. The apparatus for purifying exhaust gas of claim 12, wherein:
the SCR is made of one selected from one of a zeolite catalyst and a metal catalyst supported on porous alumina, or a combination thereof.

14. The apparatus for purifying exhaust gas of claim 13, wherein:
the zeolite catalyst is made such that at least one element of copper (Cu), platinum (Pt), manganese (Mn), iron (Fe), cobalt (Co), nickel (Ni), zinc (Zn), cesium (Cs) exchange ions one another.

15. The apparatus for purifying exhaust gas of claim 13, wherein:
the metal catalyst supported on porous alumina is made such that at least one metal of platinum (Pt), palladium (Pd), rhodium (Rh), iridium (Ir), ruthenium (Ru), tungsten (W), chrome (Cr), manganese (Mn), iron (Fe), cobalt (Co), copper (Cu), zinc (Zn), silver (Ag) are supported on the porous alumina.

* * * * *